United States Patent
Li

(10) Patent No.: US 11,533,163 B2
(45) Date of Patent: Dec. 20, 2022

(54) MINING METHOD AND DEVICE BASED ON BLOCKCHAIN, AND COMPUTER READABLE STORAGE MEDIUM

(71) Applicants: CHONGQING JINVOVO NETWORK TECHNOLOGY CO., LTD., Chongqing (CN); Yihua Zhou, Zhejiang (CN)

(72) Inventor: Lizhong Li, Zhejiang (CN)

(73) Assignees: CHONGQING JINVOVO NETWORK TECHNOLOGY CO., LTD., Chongqing (CN); LI ZHAN (SHANGHAI) TECHNOLOGY CO., LTD., Shanghai (CN)

(*) Notice: Subject to any disclaimer, the term of this patent is extended or adjusted under 35 U.S.C. 154(b) by 61 days.

(21) Appl. No.: 16/960,825

(22) PCT Filed: Jan. 17, 2018

(86) PCT No.: PCT/CN2018/072992
§ 371 (c)(1),
(2) Date: Jul. 8, 2020

(87) PCT Pub. No.: WO2019/136768
PCT Pub. Date: Jul. 18, 2019

(65) Prior Publication Data
US 2020/0366748 A1    Nov. 19, 2020

(30) Foreign Application Priority Data
Jan. 9, 2018    (CN) .......................... 201810018810.8

(51) Int. Cl.
*H04L 9/06*    (2006.01)
*G06Q 30/02*    (2012.01)
(Continued)

(52) U.S. Cl.
CPC ....... *H04L 9/0637* (2013.01); *G06Q 30/0225* (2013.01); *H04L 67/10* (2013.01); *H04L 67/535* (2022.05); *H04L 9/50* (2022.05)

(58) Field of Classification Search
None
See application file for complete search history.

(56) References Cited

U.S. PATENT DOCUMENTS 9,516,035 B1 *  12/2016  Moritz ................. G06F 21/602
10,187,214 B2 *  1/2019  Ferrin .................. H04L 9/3247
(Continued)

FOREIGN PATENT DOCUMENTS

CN    106571933 A  *  4/2017  ......... H04L 12/1822
CN    106803179 A     6/2017
(Continued)

OTHER PUBLICATIONS

International Search Report (PCT/ISA/210) dated Oct. 11, 2018, by the Chinese Patent Office as the International Searching Authority for International Application No. PCT/CN2018/072992.
(Continued)

*Primary Examiner* — Lashonda Jacobs-Burton
(74) *Attorney, Agent, or Firm* — JW Law Group; James M. Wu

(57) ABSTRACT

The embodiments of the invention relate to a mining method and device based on a blockchain, and a computer readable storage medium. The method comprises: acquiring behavior data of at least one user within a cycle; determining a value corresponding to each user in the at least one user within the cycle according to the behavior data of the at least one user and a value of a rated quantity within the cycle; and recording an identifier, the behavior data and the value of the at least one user within the cycle in the blockchain, so as to realize more reasonable and more resource-efficient mining.

10 Claims, 2 Drawing Sheets

(51) Int. Cl.
  H04L 67/50 (2022.01)
  H04L 67/10 (2022.01)
  H04L 9/00 (2022.01)

(56) References Cited

U.S. PATENT DOCUMENTS

| | | | | |
|---|---|---|---|---|
| 10,678,596 | B2* | 6/2020 | Xie | H04L 47/823 |
| 10,754,936 | B1* | 8/2020 | Hawes | G06F 21/316 |
| 11,197,155 | B2* | 12/2021 | Breu | G06F 21/32 |
| 2015/0356555 | A1* | 12/2015 | Pennanen | G06Q 20/4014 |
| | | | | 705/71 |
| 2016/0012424 | A1* | 1/2016 | Simon | G06Q 20/308 |
| | | | | 705/67 |
| 2016/0071108 | A1* | 3/2016 | Caldera | G06Q 20/4016 |
| | | | | 705/75 |
| 2017/0046652 | A1* | 2/2017 | Haldenby | G06Q 20/401 |
| 2017/0046806 | A1* | 2/2017 | Haldenby | G06F 21/62 |
| 2017/0242731 | A1* | 8/2017 | Xie | G06F 9/5027 |
| 2018/0139042 | A1* | 5/2018 | Binning | G06Q 20/1235 |
| 2018/0314684 | A1* | 11/2018 | Johnson, Jr. | G06Q 10/1053 |
| 2018/0330001 | A1* | 11/2018 | Zhou | G06F 16/9535 |
| 2019/0164150 | A1* | 5/2019 | Lee | G06Q 20/363 |
| 2019/0208418 | A1* | 7/2019 | Breu | H04L 9/3239 |
| 2020/0065137 | A1* | 2/2020 | Wigder | G06F 21/602 |
| 2020/0320222 | A1* | 10/2020 | Zhou | G06F 16/27 |

FOREIGN PATENT DOCUMENTS

| | | |
|---|---|---|
| CN | 106815685 A | 6/2017 |
| CN | 106952117 A | 7/2017 |
| CN | 107085582 A | 8/2017 |
| CN | 110598111 A * | 12/2019 |

OTHER PUBLICATIONS

Written Opinion (PCT/ISA/237) dated Oct. 11, 2018, by the Chinese Patent Office as the International Searching Authority for International Application No. PCT/CN2018/072992.

* cited by examiner

MINING METHOD AND DEVICE BASED ON BLOCKCHAIN, AND COMPUTER READABLE STORAGE MEDIUM

BACKGROUND OF THE INVENTION

1. Technical Field

The invention relates to the technical field of computers, in particular to a mining method and device based on a blockchain, and a computer readable storage medium.

2. Description of Related Art

With the continuous development of the Internet, blockchain technology has been applied to more and more fields for its distributed characteristics and the immutability of data.

However, current mining methods based on the blockchain technology generally involve hash collision, like bitcoin mining. Under this mining mechanism, with the decrease in the number of coins and the increase in the number of mining machines, the requirement for the computing power of mining machines is becoming higher and higher, which leads to increasing resource consumption and less output.

BRIEF SUMMARY OF THE INVENTION

The embodiments of the invention provide a mining method and device based on a blockchain, and a computer readable storage medium, so as to realize more reasonable and more resource-efficient mining.

In one aspect, an embodiment of the invention provides a mining method based on a blockchain, characterized by comprising:

acquiring behavior data of at least one user within a cycle;

determining a value corresponding to each user in the at least one user within the cycle according to the behavior data of the at least one user and a value of a rated quantity within the cycle; and recording an identifier, the behavior data and the value of the at least one user within the cycle in the blockchain.

In an optional implementation, before acquiring the behavior data of the at least one user within the cycle, the method further comprises:

determining the value of the rated quantity within the cycle; and pushing a task to the at least one user according to the value of the rated quantity, so as to generate the behavior data when the at least one user executes the task.

In an optional implementation, before pushing the task to the at least one user, the method further comprises:

determining a task acquisition request of the at least one user.

In an optional implementation, determining the value corresponding to each user in the at least one user within the cycle according to the behavior data of the at least one user and the value of the rated quantity within the cycle comprises:

determining a proportion of the behavior data of each user in the at least one user, wherein the behavior data of the at least one user are behavior data of all users included within the cycle; and determining the value corresponding to each user in the at least one user according to the proportion corresponding to the at least one user and the value of the rated quantity.

In an optional implementation, the method further comprises:

determining the identifier and behavior data of a reported user; and when the behavior data of the reported user are not compliant, transferring the value corresponding to the behavior data of the user to a user reporting the reported user based on the blockchain.

In another aspect, an embodiment of the invention provides a mining device based on a blockchain. The device comprises:

an acquiring unit, configured to acquire behavior data of at least one user within a cycle;

a first determining unit, configured to determine a value corresponding to each user in the at least one user within the cycle according to the behavior data of the at least one user and a value of a rated quantity within the cycle; and a recording unit, configured to record an identifier, the behavior data and the value of the at least one user within the cycle in the blockchain.

In an optional implementation, the device further comprises:

a second determining unit, configured to determine the value of the rated quantity within the cycle; and a pushing unit, configured to push a task to the at least one user according to the value of the rated quantity, so as to generate the behavior data when the at least one user executes the task.

In an optional implementation, the device further comprises:

a third determining unit, configured to determine a task acquisition request of the at least one user.

In an optional implementation, the first determining unit is specifically configured to determine a proportion of the behavior data of each user in the at least one user, wherein the behavior data of the at least one user are behavior data of all users included within the cycle; and determine the value corresponding to each user in the at least one user according to the proportion corresponding to the at least one user and the value of the rated quantity.

In an optional implementation, the device further comprises:

a fourth determining unit, configured to determine the identifier and behavior data of a reported user; and a transferring unit, configured to transfer the value corresponding to the behavior data of the user to a user reporting the reported user based on the blockchain when the behavior data of the reported user are not compliant.

In another aspect, a computer readable storage medium is provided, comprising computer readable instructions which, when read and executed by a computer, cause the computer to execute the method according to any one or more aspects.

In another aspect, a computer program product is provided, comprising computer instructions which, when read and executed by a computer, cause the computer to execute the method according to any one or more aspects.

According to the embodiments of the invention, mining is realized based on the behavior data of the user, so that the traditional mining mechanism relying on computing power is changed, the requirement of mining for hardware is reduced, energy is saved, and the possibility of sustainable development of the blockchain technology is improved. Meanwhile, the embodiments of the invention promote the participation of the user, thus increasing user stickiness. The embodiments of the invention provide more accurate data support for big data operation, and are closer to users.

DETAILED DESCRIPTION OF THE INVENTION

In order to make the purpose, technical scheme and advantages of the embodiments of the invention clearer, the technical scheme in the embodiments of the invention will be described clearly and completely below with reference to the drawings in the embodiments of the invention. Obviously, the embodiments in the following description are merely illustrative ones, and not all possible ones of the invention. Based on the following embodiments of the invention, all other embodiments obtained by those of ordinary skill in the art without creative labor are within the protection scope of the invention.

Figure 1:
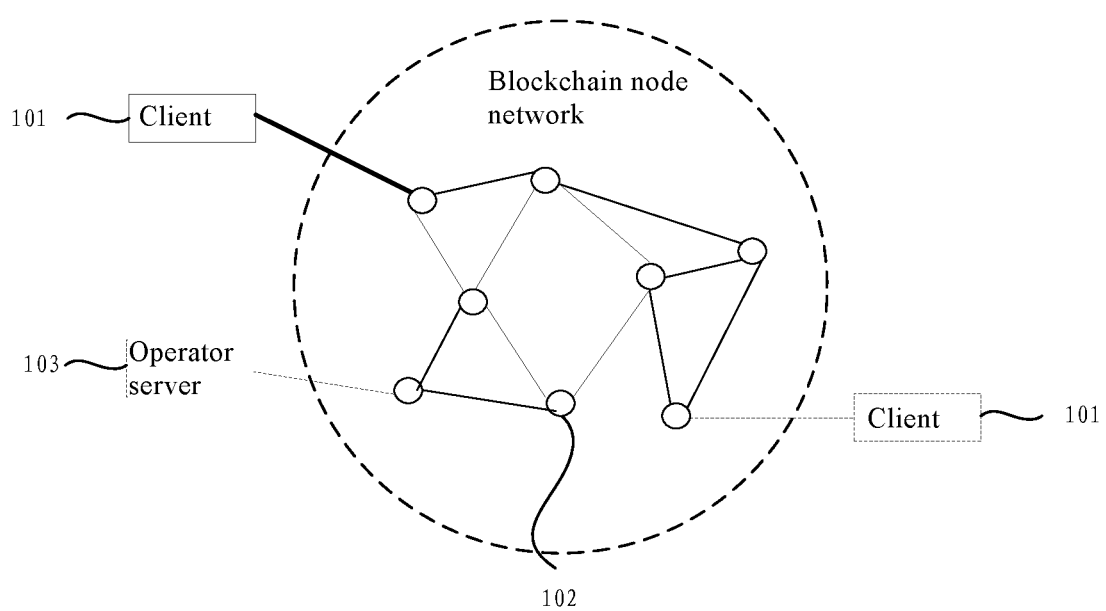
FIG. 1 is a schematic diagram of a scene.

The embodiments of the invention provide a mining method and device based on a blockchain. The method is applicable to the application scenario shown in FIG. 1. As shown in FIG. 1, the application scenario includes one or more clients 101, such as notebook computers, desktop computers, and mobile terminals; and one or more blockchain nodes 102 and one or more operator servers 103; wherein the one or more clients 101 and the one or more operator servers 103 are connected with the one or more blockchain nodes 102.

The one or more blockchain nodes 102 have blockchains stored therein. The clients 101 and the one or more operator servers 103 can acquire the blockchains from the one or more blockchain nodes 102.

The one or more clients 101 are configured to communicate with the one or more operator servers 103, and the one or more clients 101 are also configured to interact with a user and collect behavior data of the user.

The one or more operator servers 103 are mainly configured to mine according to the behavior data of the user, that is, to allocate a value to the user according to the behavior data of the user.

In the embodiments of the invention, mining can refer to a process that users obtain the distribution values of operators.

In application, a value of behavioral precipitation data is analyzed to realize digital mining. The behavioral precipitation data can be regarded as an excavated digital mine, which has a certain value.

Specifically, a corresponding value can be generated only from a behavior of the user, and the value can refer to commercial value. For example, the user writes a book on a terminal; the user runs as a workout; and the user make purchases through mobile payment. Therefore, by analyzing the behavior of the user, the value generated by the behavior can be determined.

Furthermore, the operator servers sort out the behaviors of the user, and assign different values to different user behaviors, so as to realize mining. Besides, sorting user behaviors can provide reliable data support for big data calculation.

The behavior data and values of the user are recorded in the blockchain, which can be queried through blockchain nodes and cannot be falsified.

In order to facilitate the understanding of the embodiments of the invention, specific embodiments will be further explained with reference to the accompanying drawings, and the embodiments do not constitute a limitation of the embodiments of the invention.

Figure 2:
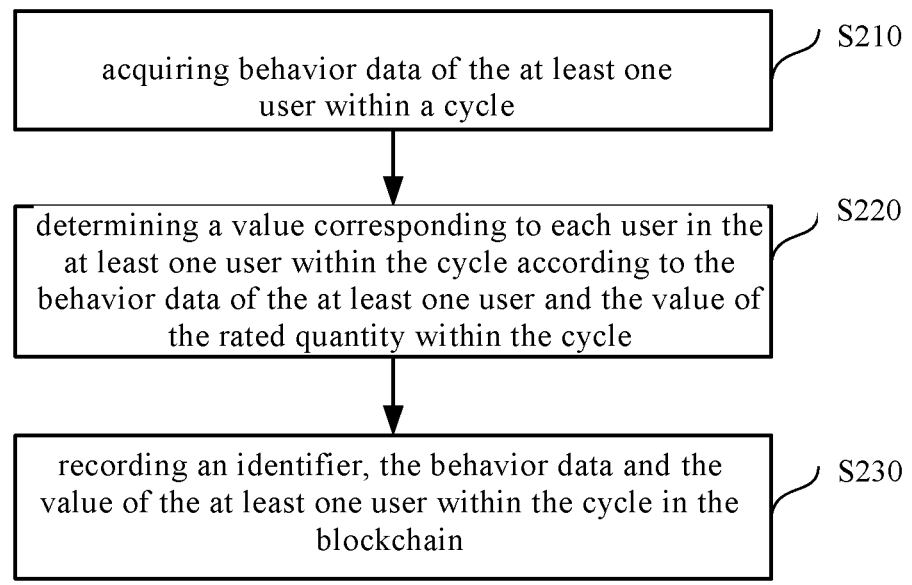
FIG. 2 is a flowchart of a mining method based on a blockchain provided by an embodiment of the invention.

FIG. 2 is a flowchart of a mining method based on a blockchain provided by an embodiment of the invention. The method can be implemented by a terminal, an operator server, or the cooperation of the two in the scenario shown in FIG. 1. As shown in FIG. 2, the method specifically comprises:

S210, behavior data of at least one user within a cycle are acquired.

This process can also be a precipitation process of the behavior data, so that behavioral precipitation data of the user can be obtained by precipitation. The behavioral precipitation data can be regarded as an excavated digital mine.

The cycle can refer to a cycle in which the operator issues a value, that is, in this cycle, the operator issues a value of a rated quantity.

The cycle can be determined according to actual needs, for example, the cycle can be one working day, one week, one month, or the like.

The cycle can also be classified, for example, according to time length, there can be monthly cycle and daily cycle.

The same time point can be included in different types of cycles. For example, daily cycle and monthly cycle can coexist. The different types of cycles can be independent of one another or include one another. For example, daily cycle and monthly cycle can be independent of each other, or monthly cycle can realize value distribution by sorting out the data of daily cycle within monthly cycle.

The value can be in the form of point, currency, token, credit score, consumption ability evaluation, commercial value, etc.

The behavior data of the user can at least include sports, shopping, traveling, getting around, dining, entertainment, socializing, work, rest, beauty treatment and so on. For example, sports data can include information such as sports duration, sports type, location, and physical function.

The user can refer to a user registered in a system. After the user is registered, an account can be assigned to the user. The account receives notifications from the system and stores an address for value transfer. The system can refer to a platform on which merchants, consumers and other organizations can register. The other organizations can be other functional organizations or individuals, for example, third-party accreditation bodies.

The terminal can collect the behavior data of the user within the cycle and send the behavior data of the user to the operator server.

In an example, every time the user completes a behavior, the terminal can send the behavior data corresponding to the behavior to the operator server, for example, the running data of the user.

In another example, the terminal may send the behavior data of the user to the operator server every other set interval. The set interval is shorter than or equal to the aforementioned cycle.

The operator server can predetermine the value of the rated quantity within the cycle, and push a task to the user according to the value of the rated quantity. The behavior data are generated when the user performs the task, and then sent to the operator server. The value of the rated quantity can refer to the maximum total value that can be generated in the system within the cycle, or the total value of user behaviors within the cycle. The value of the rated quantity can be a predetermined fixed value, or a value determined by the operator server according to a feature in real time of the cycle. For example, if the cycle is a holiday, the value of the rated quantity can be raised.

In an example, the operator server can push a recommended task list to the user according to the actual needs and the value of the rated quantity, and the list may include weights corresponding to different tasks. For example, a low-carbon transportation task can be pushed to the user during the morning rush hour. In this task, shared bicycles correspond to the highest weight, followed by electric vehicles.

In another example, the operator server may determine a task acquisition request of at least one user. The operator server pushes the task to the at least one user according to the task acquisition request. For example, if the user has a demand for shopping recently, the user can send a shopping task acquisition request to the operator server through the client. The operator server can push a shopping related task list to the user based on the value of the rated quantity within the cycle.

The task pushed to the user according to the value of the rated quantity may include a total value that can be divided by the user when the task is completed. The value of rated quantity can be divided into several categories according to the behavior type, and each category corresponds to a value of a rated quantity. Specifically, the operator server can maintain a value table of a rated quantity, which may include the value of the rated quantity corresponding to each category and the total value within the cycle.

S220, a value corresponding to each user in the at least one user within the cycle is determined according to the behavior data of the at least one user and the value of the rated quantity within the cycle.

This step can evaluate the value of the behavior data of the user, that is, the value of the excavated digital mine.

The value of the excavated digital mine can be determined in at least the following ways.

In an example, the value of the behavior data of the user can be determined based on the principle of more pay for more work. On this basis, in an example, the operator server can determine a proportion of the behavior data of each user in the at least one user, wherein the behavior data of the at least one user are behavior data of all users included within the cycle, and determine the value corresponding to each user in the at least one user according to the proportion corresponding to the at least one user and the value of the rated quantity.

In another example, the value of the behavior data of the user can also be determined on a first-come-first-served basis. On this basis, in one example, the operator server determines the behavior data of the user, and determines the value of one or more features corresponding to the behavior data of the user when the behavior data of the user meet a condition and the value of the rated quantity has sufficient margin. When the behavior data of the user meet the condition, but the value of the rated quantity has no margin or insufficient margin, it is determined that the value corresponding to the behavior data of the user is the value margin of the rated quantity. When the behavior data of the user do not meet the condition, it is determined that the value of the behavior data of the user is 0. The condition corresponding to the behavior data of the user can be determined in advance, for example, the condition can be whether a behavior threshold is reached. For example, for consumption behaviors, whether an amount spent by the user reaches a threshold can be determined, and multiple amount threshold levels can be set, the higher the level met, the higher the value obtained. For another example, for sports behaviors, whether the exercise time of the user reaches a threshold can be determined.

In another example, it can be based on the principle that each participant has an equal share. Specifically, the operator server determines whether a preset rule is met according to the behavior data of the at least one user, and the value of the rated quantity within the cycle is equally distributed to all users meeting the preset rule.

In another embodiment, it can be based on the principle of random allocation to those who meet the condition. Specifically, a maximum value and a minimum value for random allocation can be set, and the operator server randomly allocates a value to the user after determining that the behavior data of the user meet the preset rule. Or, the operator server determines the behavior data of all users within the cycle, and randomly allocates values to the users who meet the preset rule till the value of the rated quantity is allocated.

There are many ways to distribute the value to the user, no more detail will be given here.

S230, an identifier, the behavior data and the value of the at least one user within the cycle are recorded in the blockchain.

After determining the value corresponding to the behavior data of the user, the operator server can record the value, the identifier and the behavior data of the user in the blockchain and sync to web. Then the client can download the blockchain through the blockchain node and view the value in its account.

The identifier of the user can be an account identifier of the user or an address used by the user to store an issued value, which is an initial address, and the initial address is a source of the value in the subsequent transaction of the value corresponding to the behavior data of the user. The address where the user stores the issued value can be generated by the operator server and then sent to an account of the user, or generated by the client and then sent to the operator server.

The identifier of the user can be acquired when the behavior data of the user are acquired.

During blockchain recording, all the newly generated values within the cycle can be packaged into the blockchain, and the packaged values can be traded only in a subsequent cycle.

In another embodiment, since the behavior data of the user are generally sorted out by the client used by the user and uploaded to the operator server, in order to improve the authenticity of the behavior data of the user, a reward and punishment mechanism can be added into this system.

The user can report false user behavior data. After reporting, the reporter can get corresponding rewards, and those who are reported will be punished accordingly.

The reported behavior data can be submitted to a server of a third party or the operator server for review. Reward and punishment measures are implemented after review.

Specifically, the operator server determines the identifier and behavior data of the reported user; and when the behavior data of the reported user are not compliant, the value corresponding to the behavior data of the user is transferred to a user reporting the reported user based on the blockchain. In addition, when pushing the task to the user, the operator server can also push a reporting task. In order to improve the authenticity of data and encourage the users to report false data, the magnitudes of rewards and punishments can be appropriately increased.

According to the embodiments of the invention, mining is realized based on the behavior data of the user, so that the traditional mining mechanism relying on computing power is changed, the requirement of mining for hardware is reduced, energy is saved, and the possibility of sustainable development of the blockchain technology is improved. Meanwhile, the embodiments of the invention promote the participation of the user, thus increasing user stickiness. The embodiments of the invention provide more accurate data support for big data operation, and are closer to users.

Figure 3:
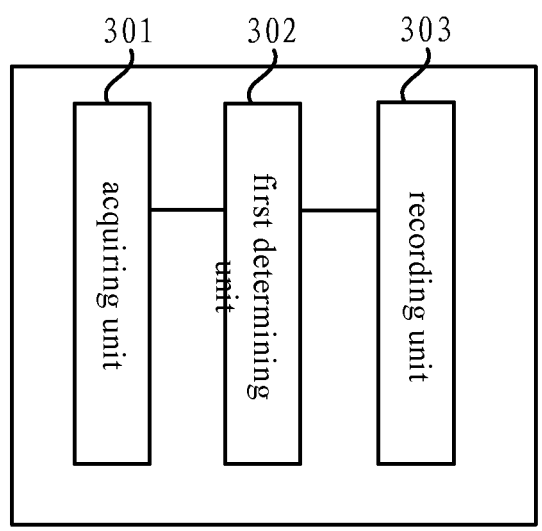
FIG. 3 is a structural diagram of a mining device based on a blockchain provided by an embodiment of the invention.

FIG. 3 is a mining device based on a blockchain provided by an embodiment of the invention. The device is used to execute the method in the embodiment shown in FIG. 2, and can be understood by referring thereto. The device comprises:

an acquiring unit 301, configured to acquire behavior data of at least one user within a cycle;

a first determining unit 302, configured to determine a value corresponding to each user in the at least one user within the cycle according to the behavior data of the at least one user and a value of a rated quantity within the cycle; and a recording unit 303, configured to record an identifier, the behavior data and the value of the at least one user within the cycle in the blockchain.

In an example, the device further comprises:

a second determining unit, configured to determine the value of the rated quantity within the cycle; and a pushing unit, configured to push a task to the at least one user according to the value of the rated quantity, so as to generate the behavior data when the at least one user executes the task.

In another example, the device further comprises:

a third determining unit, configured to determine a task acquisition request of the at least one user.

In another example, the first determining unit is specifically configured to determine a proportion of the behavior data of each user in the at least one user, wherein the behavior data of the at least one user are behavior data of all users included within the cycle; and determine the value corresponding to each user in the at least one user according to the proportion corresponding to the at least one user and the value of the rated quantity.

In another example, the device further comprises:

a fourth determining unit, configured to determine the identifier and behavior data of a reported user; and a transferring unit, configured to transfer the value corresponding to the behavior data of the user to a user reporting the reported user based on the blockchain when the behavior data of the reported user are not compliant.

Professionals should further realize that the units and algorithm steps of each example described in connection with the embodiments disclosed herein can be implemented in electronic hardware, computer software or a combination of the two. In order to clearly explain the interchangeability of hardware and software, the components and steps of each example have been generally described according to functions in the above description. Whether these functions are implemented in hardware or software depends on the specific application and design constraints of the technical scheme. Professionals can use different methods to implement the described functions for each specific application, but such implementation should not be considered beyond the scope of the invention.

The steps of a method or algorithm described in connection with the embodiments disclosed herein may be implemented in hardware, a software module executed by a processor, or a combination of the two. The software module can be placed in a random access memory (RAM), memory, read-only memory (ROM), electrically programmable ROM, electrically erasable programmable ROM, register, hard disk, removable magnetic disk, CD-ROM, or any other form of storage medium known in the technical field.

The above-mentioned specific embodiments have further explained the purpose, technical scheme and beneficial effects of the invention in detail. It should be understood that the above-mentioned embodiments are only specific embodiments of the invention and not used to limit the protection scope of the invention. Any modifications, equivalent substitutions, improvements, etc. made within the scope of the invention should be included in the protection scope of the invention.

What is claimed is:

1. A mining method based on a blockchain, comprising:
   acquiring behavior data of at least one user by a client device within a cycle;
   forwarding the behavior data from the client device to an operator server via one or more nodes of a blockchain node network;
   determining a value corresponding to the at least one user by the operator server within the cycle according to the behavior data of the at least one user and a value of a rated quantity within the cycle;
   identifying an identifier of the at least one user in accordance with the blockchain; and
   recording the identifier, the behavior data and the value of the at least one user within the cycle in the blockchain via the blockchain node network.

2. The method according to claim 1, wherein before acquiring the behavior data of the at least one user within the cycle, the method further comprises:
   determining the value of the rated quantity within the cycle; and
   pushing a task to the at least one user according to the value of the rated quantity, so as to generate the behavior data when the at least one user executes the task.

3. The method according to claim 2, wherein before pushing the task to the at least one user, the method further comprises:
   determining a task acquisition request of the at least one user.

4. The method according to claim 1, wherein determining the value corresponding to the at least one user within the cycle according to the behavior data of the at least one user and the value of the rated quantity within the cycle comprises:
   determining a proportion of the behavior data of the at least one user, wherein the behavior data of the at least one user are behavior data of all users included within the cycle; and
   determining the value corresponding to the at least one user according to the proportion corresponding to the at least one user and the value of the rated quantity.

5. The method according to claim 1, further comprising:
   determining the identifier and behavior data of a reported user; and
   when the behavior data of the reported user are not compliant, transferring the value corresponding to the behavior data of the user to a user reporting the reported user based on the blockchain.

6. A mining device based on a blockchain, comprising:
an acquiring unit, configured to acquire behavior data of at least one user within a cycle;
a first determining unit, configured to determine a value corresponding to the at least one user within the cycle according to the behavior data of the at least one user and a value of a rated quantity within the cycle; and
a recording unit, configured to record an identifier, the behavior data and the value of the at least one user within the cycle in the blockchain.

7. The device according to claim 6, further comprising:
a second determining unit, configured to determine the value of the rated quantity within the cycle; and
a pushing unit, configured to push a task to the at least one user according to the value of the rated quantity, so as to generate the behavior data when the at least one user executes the task.

8. The device according to claim 7, further comprising:
a third determining unit, configured to determine a task acquisition request of the at least one user.

9. The device according to claim 6, wherein the first determining unit is specifically configured to
determine a proportion of the behavior data of the at least one user, wherein the behavior data of the at least one user are behavior data of all users included within the cycle; and
determine the value corresponding to the at least one user according to the proportion corresponding to the at least one user and the value of the rated quantity.

10. A non-transitory computer readable storage medium, comprising computer readable instructions which, when read and executed by a computer, cause the computer to execute the method according to claim 1.

* * * * *